United States Patent Office 3,390,433
Patented July 2, 1968

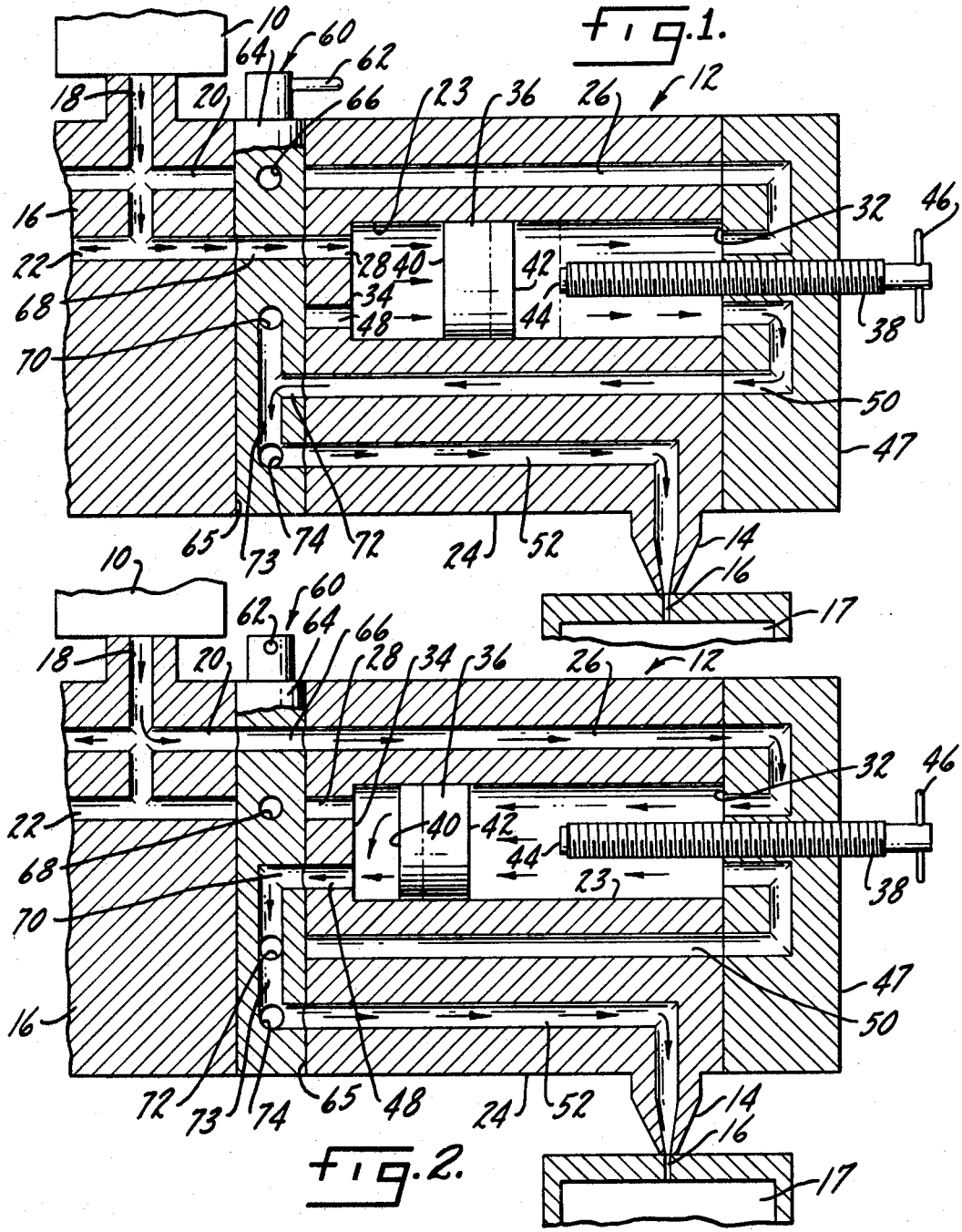

3,390,433
METERING MANIFOLD FOR MOLDING
Louis H. Barnett and Edmund R. Luther, Fort Worth, Tex., assignors, by mesne assignments, to Vistron Corporation, Cleveland, Ohio, a corporation of Ohio
Filed Feb. 1, 1966, Ser. No. 524,302
1 Claim. (Cl. 18—30)

ABSTRACT OF THE DISCLOSURE

The instant application relates to a device used on the head of an injection molding machine, said device enabling a predetermined quantity of molten plastic emanating from the heating cylinder of said machine to be charged to a mold so that a minimum quantity of said plastic material ends up as unwanted "flashed" material on the finished product.

---

This invention relates to injection molding, and particularly relates to means whereby a predetermined charge of plastified material is adapted to be delivered into a molding cavity.

An important object of this invention is a manifold apparatus adapted to deliver metered amounts of plastified material into a mold cavity so as to substantially eliminate mold flashing.

Another object is a manifold apparatus for an injection molding machine in which each charge from the heating cylinder of said machine is mediated by metering means so that an overcharge of plastified material is not delivered to a mold cavity to thereby induce mold flashing.

Another object is a manifold apparatus for an injection molding machine which is adapted to deliver metered charges of plastified material into a molding cavity independently of any possible overpacking on the heating cylinder which would normally result in mold flashing.

Another object is a manifold apparatus for injection machines which efficiently permits the apparatus to simultaneously receive, store and deliver a predetermined charge of plastified material into an adjoining mold cavity.

Another object is a manifold apparatus for injection molding machine in which adjustable means are provided to predetermine the amount of plastified material which can be delivered from the injection molding machine, and which means allow and permit an identical amount of predetermined material to be generally simultaneously delivered to the mold cavity, said delivered charge not being varied by any conditions of overpacking in the heating cylinder or the like.

Another object is a manifold apparatus for an injection molding machine which meters the amount of plastified material received from the machine by receiving such plastified material in a chamber in which shuttle means accommodate a metered amount of deposited plastified material while, at the same time, expelling a previously metered amount from the chamber on the opposite side during such accommodating excursion, said cycle being repeated upon excursion of the shuttle means in the opposite direction.

Another object is an assembly having a plurality of manifolds for metering a charge of plastified material from a heating cylinder of an injection machine.

Such objects are attained as well as other objects which will become apparent from considering the invention presented in the following disclosure, including drawings wherein:

FIGURE 1 is a schematic view partly in section of the manifold, along with portions of the injection machine likewise indicated schematically; and FIGURE 2 is a schematic view similar to FIGURE 1, but showing the other position and operation of the manifold.

The appearance of the same numerals in the different views is a reference to the same parts.

The schematic illustration of FIGURE 1 shows an injection machine 10 which is adapted to deliver a charge of plastified material into a manifold shown generally at 12, and which plastified material leaves one leg of the manifold at nozzle 14 into sprue 16 which is conveniently provided next to a mold cavity 17.

The manifold includes a body section having a part 16 with a common passageway 18 communicating with the heating or shooting cylinder 10. An upper communicating passageway 20 and a lower communicating passageway 22 are joined to the common passageway 18. Passageways 20, 22 are adapted to register with other passageways in part 24 of the body section. This part has opposite inlet passageways 26 and 28 which communicate with cylinder chamber 23 in part 24. The plastified material is shown as being delivered to part 24 of the manifold, but such material may also be delivered to another leg as indicated by the arrow path. Such part is not shown but it could be similar to part 24. It is seen that inlet 26 empties into end 32 of the chamber and inlet 28 empties into opposite end 34.

Within the chamber 23 is a free floating or shuttle piston 36 which limits of excursion are defined by end 34 of the cylindrical chamber and limit screw 38. The free floating face 40 contacts end 34 of the chamber, and is further adapted to move in the other direction until opposite face 42 contacts abutment 44 of screw 38. This position of the piston is indicated by phantom outline in FIGURE 1. The longitudinal axis of the screw 38 is generally parallel to the longitudinal axis of the cylindrical chamber 23 and is extended therealong by actuating means such as the handle 46. The screw is conventionally engaged in a threaded bore in the end 32 of the cylindrical chamber. A removable end cap 47 may be provided for obtaining access into the chamber.

The contents of the cylindrical chamber empty into outlets 48 and 50 at opposite ends of the chamber. The plastified material passing through outlets 48, 50 is adapted to empty into common mold passageway 52, and then out of the manifold into a mold cavity.

The plastified material from the injection machine is delivered to the cylindrical chamber and expelled out of the cylindrical chamber cavity by connecting the various passageways with a valve shown generally as 60. Such a valve is shown as a two position rotatable member having a handle 62 which may be used to rotate a circular body member 64 in a matching passageway 65. Body member 64 has a bore 66 which is adapted to register passageway 20 and inlet 26; another bore 68 is adapted to register passageway 22 and inlet 28 at the opposite end of the chamber; a further bore 70 is adapted to register with the outlet 48; and a bore 72 is adapted to register with outlet 50 which empties the plastified material from the opposite end of the chamber. A bore 74 is registered with mold passageway 52 at both positions of the valve. Valve passageway 73 communicates with bores 70, 72 and 74.

The use and operation of my invention are as follows:

The manifold apparatus is adapted to be combined in an injection machine wherein such manifold mediates the delivery of plastified material from the heating or shooting cylinder to the mold cavity. The granular material to be plastified is continually fed in the usual way to the shooting cylinder 10 by a weight or volume feed which is controlled by the amount of plastified material injected by the cylinder to the manifold. The charge of plastified material which is injected by the cylinder need not be finely controlled because the charge which will actually be delivered to the molding cavity will be determined by the manifold.

A cycle of receiving, storing and delivering charges of plastified material is repeatedly executed in the manifold. To illustrate a selected initiation of the cycle, the valve 60 is moved to a first position as shown in FIGURE 1, whereupon a charge of plastified material from the shooting cylinder is delivered into common passageway 18, then through communicating passageway 22, bore 68 of valve 62 and inlet 28. The plastified material along this route is emptied into one end of the cylinder against face 40 of free floating or shuttle piston 36. The deposit of plastified material moves piston 36 to the limit of its excursion defined by contact of face 42 with abutment 44 of the screw. At this point in the cycle, the charge of material has been received and stored in the cylindrical chamber.

It will be noted that at this first position of the valve, outlet 50 from the opposite end of the cylindrical chamber is in communication with bore 72 and passageway 73 of the valve so that any plastified material in that end of the cylindrical chamber is emptied into mold passageway 52. Since for purposes of illustration, the cycle has been initiated with depositing a charge of plastified material in the opposite end of the cylindrical chamber, there is no charge to be expelled at this time. The next step in the cycle is started by turning valve 60 to a second position as illustrated in FIGURE 2. Here, the charge from the heating cylinder flows through passageway 20, bore 66 registered therewith, and into inlet 26 which empties into the cylindrical chamber at the opposite end. Such deposited material will urge the shuttle piston towards end 34 of the cylindrical chamber until face 40 makes contact with end 34. Such contact is indicated by phantom outline.

Two actions are occurring simultaneously because a charge of plastified material is received and stored between end 32 of the chamber and face 42 of the piston while, at the same time, a charge of plastified material previously stored between end 34 and face 40 of the piston is expelled into outlet 48 and into valve bore 70 registered therewith. The charge passes through valve passageway 73 and then into common mold passageway 52 where it is forced out of nozzle 14 and into sprue 16 of the mold cavity.

Since the excursion of the free floating piston in any direction is accompanied both by receiving plastified material for storage and emptying previously stored plastified material, it is required that inlets and outlets be present at opposite ends of the cylindrical chamber. The amount of plastified material which is received for storage and delivery to the molding cavity is finely controlled and is independent of varying factors such as overpacking the heating or shooting cylinder. The amount of plastified material is efficiently and neatly controlled by limiting the excursion of a shuttle piston towards one end of the cylindrical chamber. The adjustable screw, which can be variously graduated, is one convenient way for limiting the excursion but other equivalent ways may likewise be employed. Such means may be operated manually or automatically in service. The valve means has been shown as a rotatable two position circular member but any equivalent valve means could be used such as a push-pull valve and the like.

The valve is alternatively moved to its two positions as the various steps of the cycle occur and such movement will be preferably controlled by automatic or semi-automatic means. The excursion of the floating piston may, for example, trip various levers or controls to actuate the shooting cylinder and the valve means. This will be preferred in a high speed injecting molding process where movements of all the movable parts are correlated by such controls.

The foregoing invention can now be practiced, and such practitioners will know that the invention is not necessarily restricted to the particular embodiment presented herein. The scope of the invention is to be defined by the terms of the following claims as given meaning by the preceding description.

We claim:

1. In a manifold for metering a predetermined charge of molten thermoplastic resin into a mold cavity, said manifold being fixedly disposed upon the head of an extruder, the combination comprising:
    (a) a piston slidably movable in a horizontal chamber within said manifold with a to-and-fro motion actuated by the pressure of said molten resin entering said chamber from opposite directions alternately,
    (b) a valve intermittently rotatable about an axis orthogonal to the horizontal axis of said chamber, to direct the flow from the heating cylinder of said extruder to said chamber, and from said chamber to said mold cavity, said valve having four radial bores registerable in communication with manifold passageways communicating with said chamber, and also registerable in communication with manifold passageway communicating with said heating cylinder, each of said passageways having the function of conducting the flow of molten resin in one direction only, said valve having a fifth bore communicating with said mold cavity, and
    (c) a screw threadedly disposed within said manifold and extending into said chamber, said screw being adjustable along an axis parallel to the horizontal axis of said chamber to determine the quantity of the charge by setting the limit of travel of said piston.

References Cited

UNITED STATES PATENTS

| | | | |
|---|---|---|---|
| 312,872 | 2/1885 | Lord | 222—249 |
| 1,699,494 | 1/1929 | Schmidt | 222—250 |
| 2,062,181 | 11/1936 | Klaus | 222—250 |
| 2,406,239 | 8/1946 | Morgenroth | 222—250 X |

WILBUR L. McBAY, *Primary Examiner.*